United States Patent [19]

Fischer

[11] Patent Number: 5,103,446
[45] Date of Patent: Apr. 7, 1992

[54] LOCAL AREA NETWORK ADAPTIVE THROUGHPUT CONTROL FOR INSTANTANEOUSLY MATCHING DATA TRANSFER RATES BETWEEN PERSONAL COMPUTER NODES

[75] Inventor: Michael A. Fischer, San Antonio, Tex.

[73] Assignee: Moses Computers, Inc., Los Gatos, Calif.

[21] Appl. No.: 612,002

[22] Filed: Nov. 9, 1990

[51] Int. Cl.[5] ............................. H04J 3/02; H04J 3/16
[52] U.S. Cl. ................................. 370/85.1; 370/85.7; 370/84; 370/79
[58] Field of Search .................. 370/85.1, 85.2, 85.3, 370/85.4, 85.5, 85.15, 94.1, 94.2, 79, 84, 82, 83, 85.7, 24, 29, 31; 340/825.5, 825.51, 825.05, 825.06, 825.07

[56] References Cited

U.S. PATENT DOCUMENTS

| | | | |
|---|---|---|---|
| 4,736,366 | 4/1988 | Rickard | 370/85.1 |
| 4,860,309 | 8/1989 | Costello | |
| 4,908,823 | 3/1990 | Haagens et al. | 370/85.1 |
| 4,910,732 | 3/1990 | Schwarz | 370/85.1 |

Primary Examiner—Douglas W. Olms
Assistant Examiner—Wellington Chin
Attorney, Agent, or Firm—John R. Ley

[57] ABSTRACT

An adaptive throughput control for controlling the transfer of individual bytes of a message communicated between network controllers of adapters at nodes of a LAN enhances or maximizes the rate of transfer of bytes between the sending and receiving nodes at the time of each byte transmission. The adaptive throughput control is embodied in the logic of the network controllers and provides a minimum time gap between sequential ones of the data bytes transferred. The network adapter uses the motherboard DMA or programmed-I/A of the PC attached at the node for obtaining the data transfers between system memory of the PCs, rather than any local intelligence or on-board packet buffering. The adaptive throughput control incorporates handshaking which incorporates a unique signal in each data byte transferred and the unique signal is detected by the receiving network controller and in response to which a response signal is sent when the receiving network controller means is ready to accept the next data byte.

28 Claims, 4 Drawing Sheets

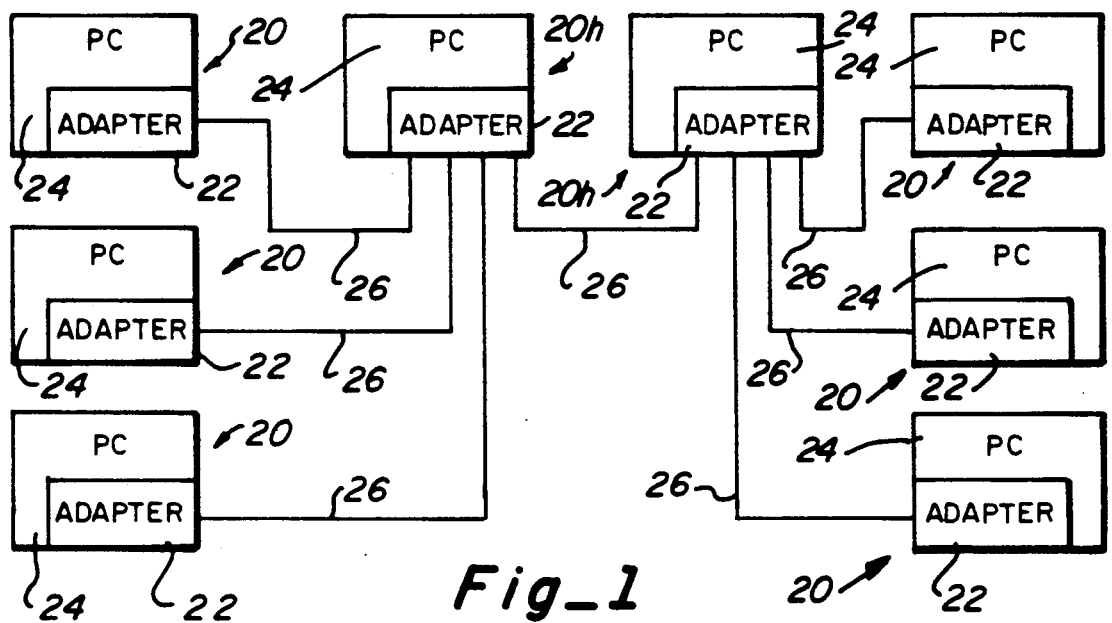
Fig_1
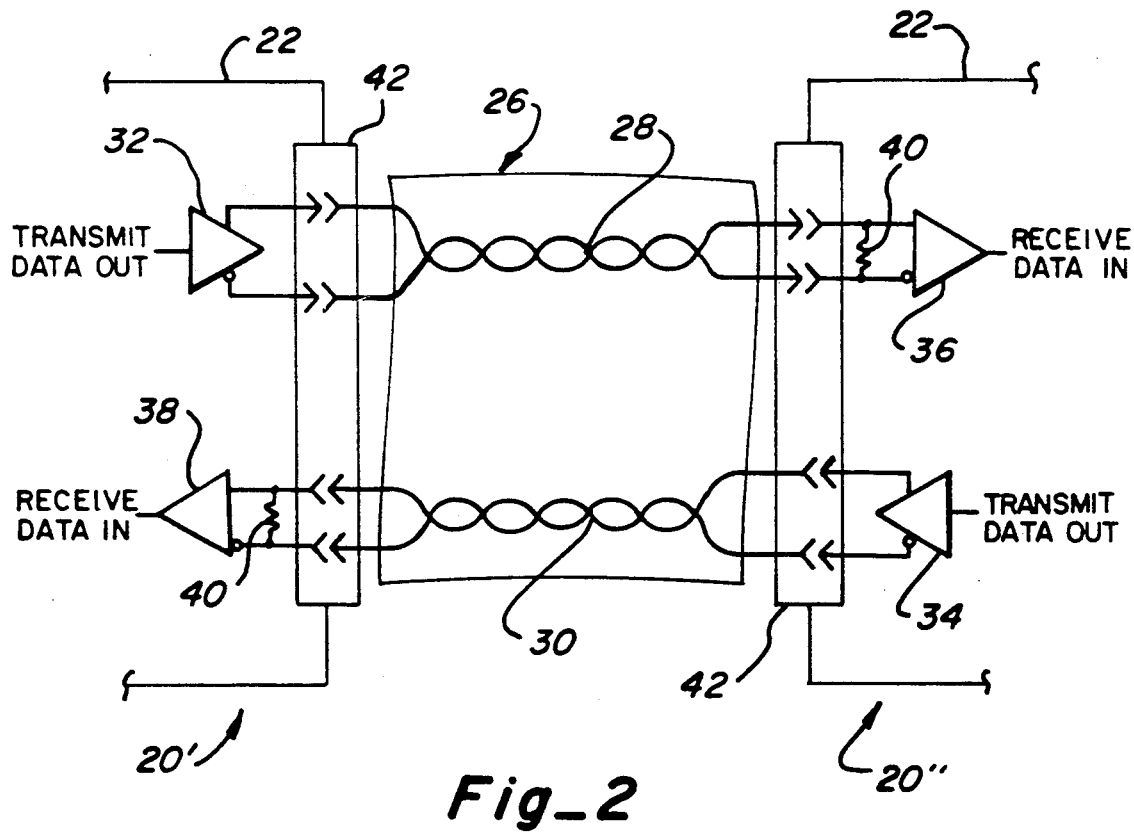
Fig_2

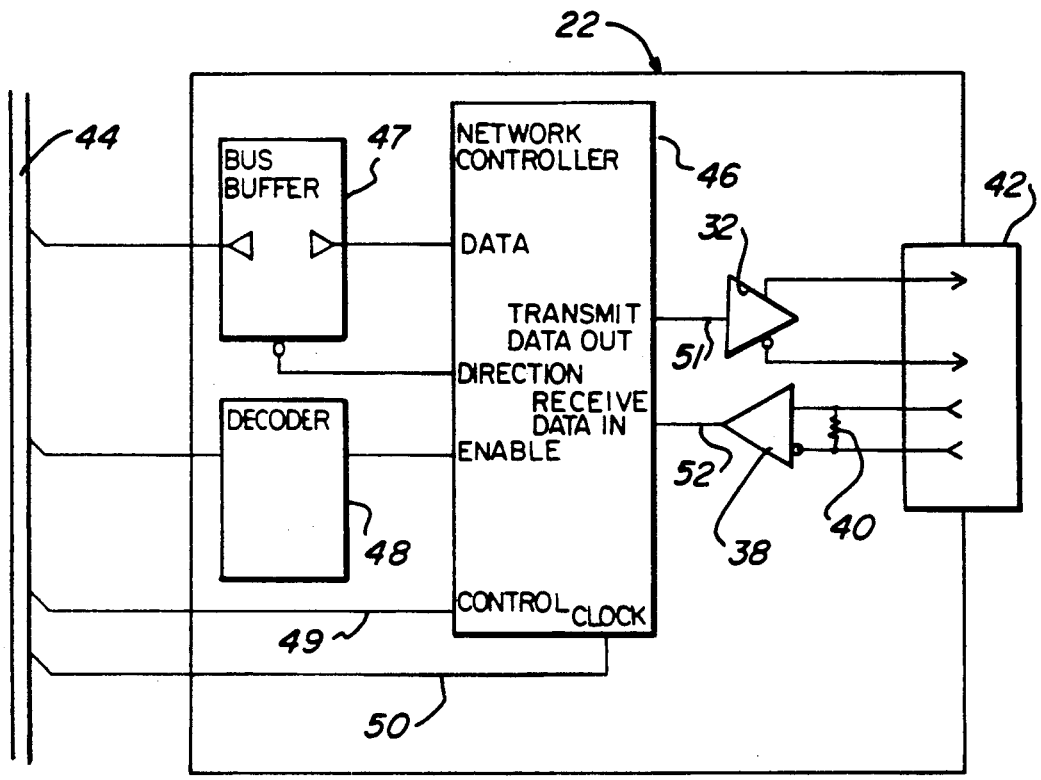
Fig_3
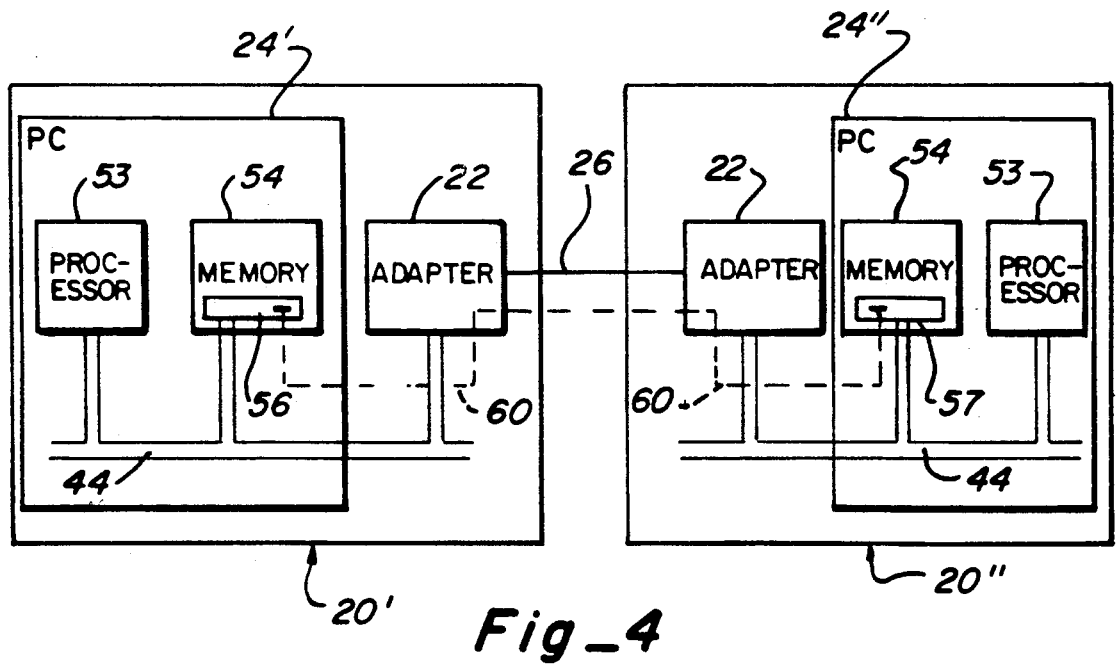
Fig_4

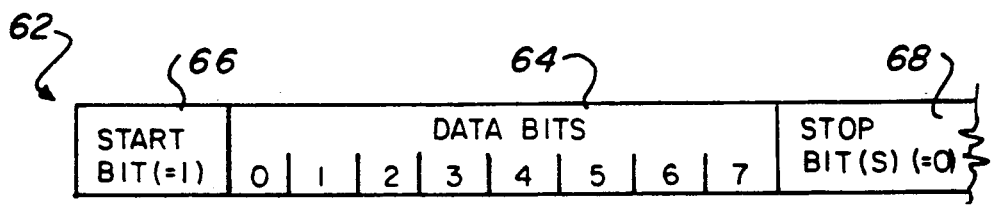
Fig_5
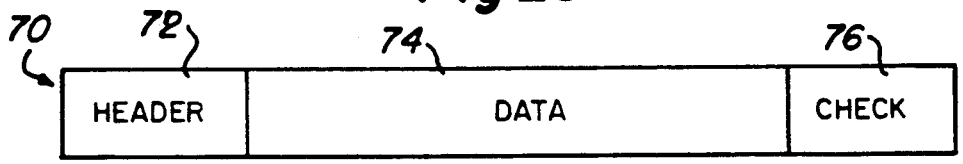
Fig_6
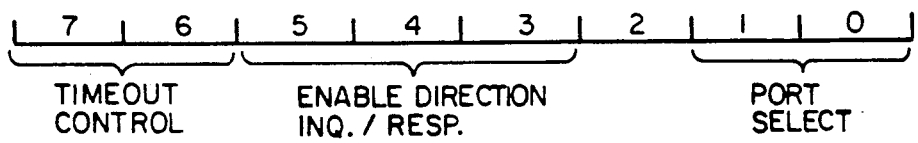
Fig_10
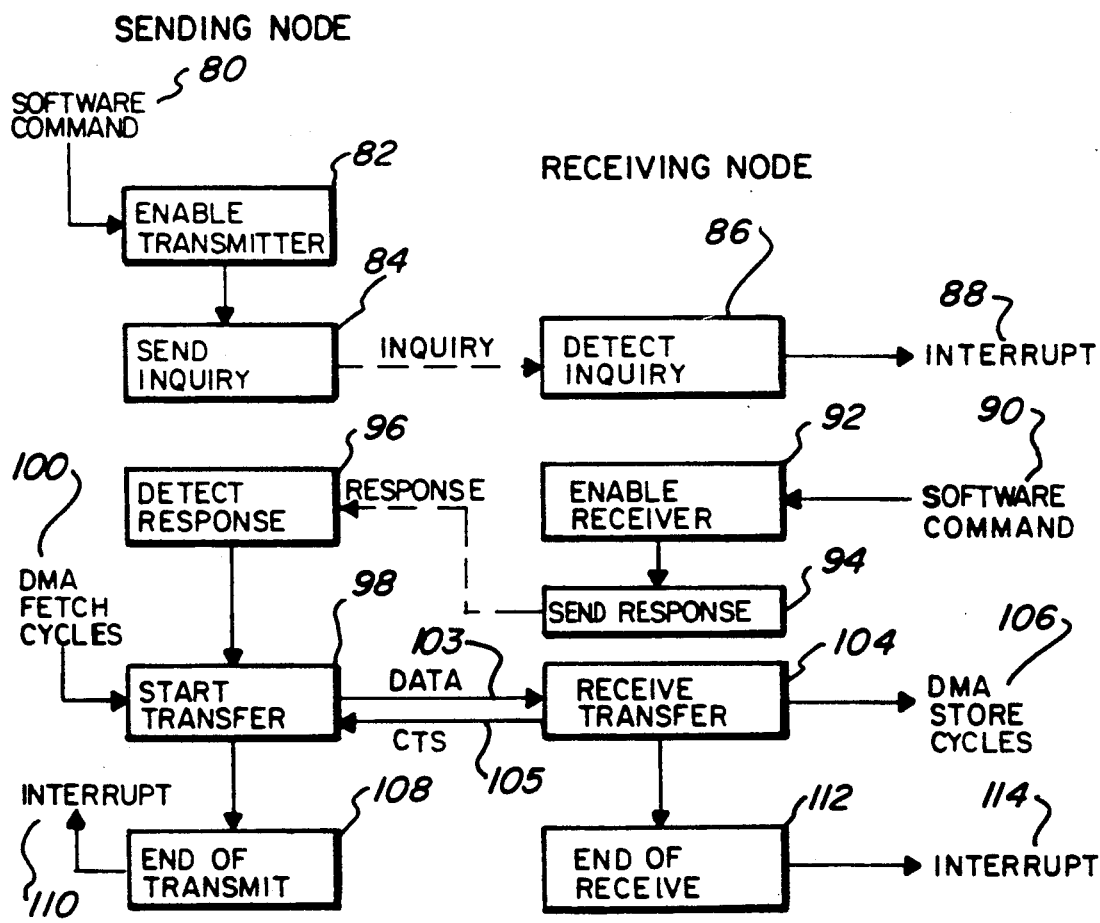
Fig_7

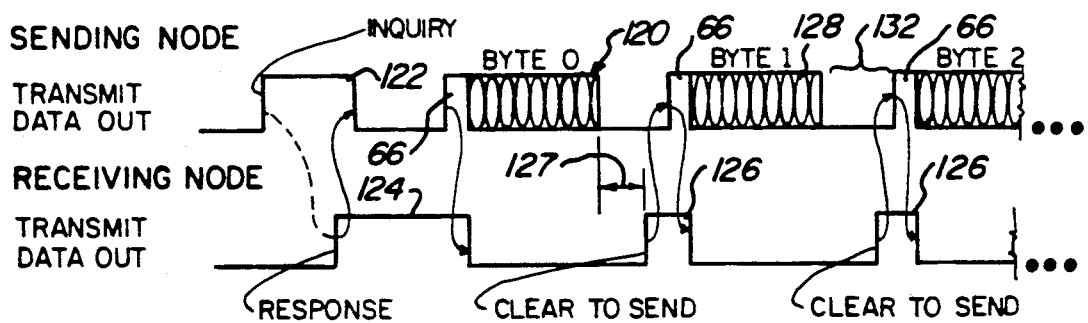
Fig_8
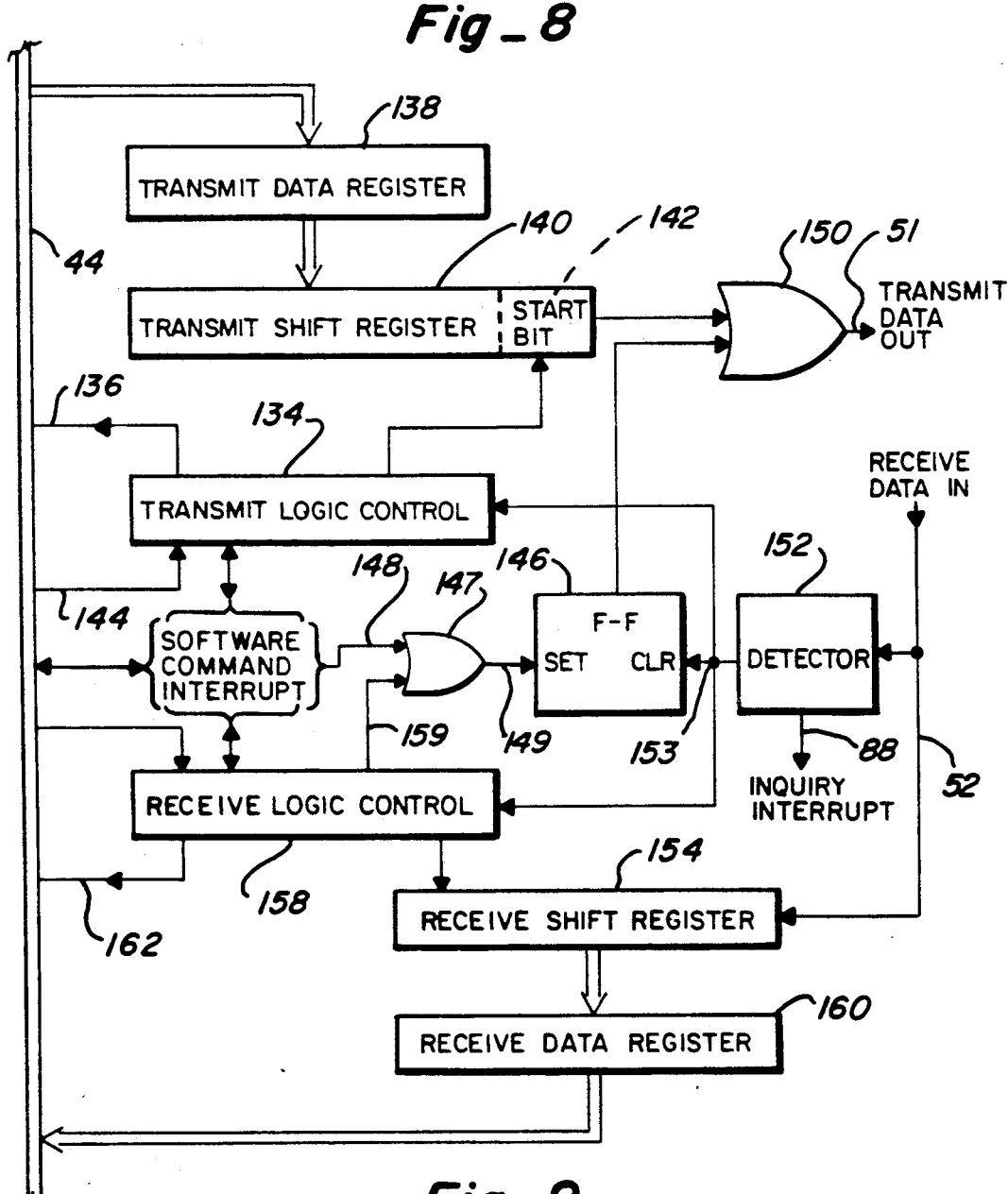
Fig_9

LOCAL AREA NETWORK ADAPTIVE THROUGHPUT CONTROL FOR INSTANTANEOUSLY MATCHING DATA TRANSFER RATES BETWEEN PERSONAL COMPUTER NODES

This invention relates to local area networks (LANs), and more particularly to relatively low cost and moderate performance LANs which are primarily intended to link personal computers (PCs) for data transfers. Even more specifically, the present invention relates to an adaptive throughput control used to match data transfer rate, on an instantaneous basis, between the network adapters at the sending and receiving nodes of the LAN so as to utilize the direct memory access (DMA) controllers of the PCs, or to utilize programmed-I/O by the central processor, for data transfers to and from the system memory of the PCs.

BACKGROUND OF THE INVENTION

In its simplest terms a LAN is a communication medium, formed by a collection of wires, optical paths, or the like, and network adapters to which a computer or other data processing-like device is connected. The network adapter and the device to which it is connected are termed a "node". A source node initiates the communication of a message to a destination node. The network adapter at a source node receives data from the device to which it is connected and sends the data over the communication medium to the destination node. The network adapter at the destination node receives the data transmitted over the network medium and delivers the communicated data to the device to which it is connected. To complete the communication, information may be communicated back and forth between the source and destination nodes, and thus both the source and destination nodes may each act as sending and receiving nodes during the communication. Communications over the medium occur in strict compliance with a predetermined network communication protocol which each of the adapters follows in sending and receiving the data. Selection of the particular nodes between which the data transfers occur is also made in compliance with the protocol, as is access to the medium for initiating the communication, among other things.

Connecting PCs and other data processing devices together achieves a variety of advantages. For example data may be shared between different PCs. In some cases, the actual computational tasks may be shared between different computers. Present trends in computer systems are emphasizing networks of computational resources. Networking PCs is already a very large part of the present market, consuming an estimated 75%-80% of the 4 million LAN connections sold in 1989.

A number of LANs are available for networking PCs, such as ARCNET (the first LAN), Ethernet (presently, the most widely used LAN), and Token Ring (presently, the most rapidly growing LAN). Presently these LANs constitute at least 80% of the installed base. However, conventional LANs are relatively expensive when used for the purpose of networking PCs, particularly in relation to the relatively moderate cost and the relatively high performance of modern PCs.

Conventional LANs were originally developed for connecting minicomputers and workstations and not for networking PCs. Early minicomputers and workstations had sustainable input/output (I/O) data rates which were variable, and quite slow by present standards. Furthermore, few if any of the earlier processing devices attached at the nodes had the computational resources available from modern PCs. Since most of the conventional LANs that were developed during this time period had data rates which exceeded the sustainable I/O rates of the processing devices which were available at that time, the network adapters incorporated considerable hardware and logic to sustain such increased data transfer rates independent of the capabilities of the device connected at the node.

The typical network adapter for a conventional LAN uses a network transceiver by which to transmit and receive signals on the medium, a network controller, and a dedicated packet buffer random access memory (RAM). The packet buffer is used to hold outgoing packets awaiting transmission and to hold incoming packets which have been received but not yet processed by the attached device. A packet is an extensive block of data, for example hundreds or thousands of bytes, which is transferred as a unit between nodes. The packet buffer is of sufficient size to hold one or more full packets, typically four to sixteen packets. The packet buffer is controlled by the network controller and is accessible to both the controller and the attached device under some form of access arbitration which is performed by the controller. The packet buffer is present to separate the network controller from the I/O timing operations of the attached processing device. Packet transfers in conventional LANs occur under circumstances dictated by the network communication protocol, which are independent of and separate from the timing operations of the attached device. The use of the packet buffers ensure that the data packet transfers can be sustained without interruptions or variations in data rate during the transfer of a packet between nodes.

Although the packet buffer was originally conceived as a necessary item to obtain the desired functionality of conventional LANs, it is also relatively expensive. Even though the RAM chips are only a few dollars at present prices, the logic to access and arbitrate the packet buffer RAM, and the circuit board conductors needed to conduct the RAM address and control signals, constitute up to 40% of the complexity of most conventional LAN adapters.

The hardware and logic required for conventional adapters is now presently recognized as more than necessary to perform the basic LAN functions between networked PCs, particularly since modern PCs inherently incorporate some of the resources and functionality which is useful in achieving basic LAN data transfer functions. Consequently efforts have been made to reduce the costs of networking PCs, and several low-cost PC networks have been offered to the PC marketplace.

To avoid some of the cost and complexity associated with the packet buffers, some LAN controllers have incorporated first-in, first-out (FIFO) buffers in lieu of RAM buffers. However, the highly variable latency on PC I/O busses relegates the applicability of the FIFO buffer approach to minicomputers and workstations. Latency is the time delay from the time the request to transfer data is received until the data transfer is performed. Latency is particularly variable in PCs, compared to other, more sophisticated computer systems.

Another early attempt to reduce the cost of networking PCs by using hardware already present in the PC is a "zero-slot LAN," designated as such because it does not require an additional plug-in adapter card to achieve network-like functionality. Zero-slot LANs use the serial I/O port of the PC to transfer data under LAN-like protocols to offer network-style functionality. The major problem with zero slot LANs is that the maximum data rates are usually far too slow. Typical zero-slot LANs transfer data at 10 Kbps-100 Kbps, with the fastest operating at less than 250 Kbps. This contrasts with data rates of 2 Mbps-10 Mbps for typical LANs. Of course, the "software-only" approach of zero-slot LANs is very inexpensive, but the performance limits have restricted the appeal of zero-slot LANs to printer-sharing (versus disk-sharing or workgroup) applications and very small networks.

A more successful attempt to reduce the cost of networking PCs by using hardware already present in the PC is to utilize the direct memory access (DMA) controller on the PC to transfer the LAN data to and from system memory. The DMA controller is on the motherboard along with the processor and the primary system memory. I/O add-in cards can request DMA service, to which the DMA controller will respond. DMA channels are universally available on all IBM and IBM-compatible PCs and are usually under-utilized. The useful function of LANs is to transport data between system memory at the source node and system memory at the destination node, and the use of the DMA channels to perform this function has advantages.

A significant problem in using the DMA channels for networking functions is that the DMA channels are relatively slow and have highly-variable latency, especially the 8-bit channels, which are present on any IBM-compatible PC. With respect to the DMA channel, latency can be further defined as the delay from the time that the DMA controller receives the DMA request until the DMA controller responds by performing the DMA data transfer. The least common denominator data rate which can be relied on for the 8-bit DMA channels of all PCs is about 1.33 Mbps, which is why most DMA-based LANs operate at data rates of 1.25 Mbps or below. With PCs having 16-bit DMA capability, this data limit can be raised to about 2 Mbps, which has been used by a few DMA-based LANs. These restrictions on the data rate are needed because, if the LAN data rate exceeds the data rate at which the DMA can supply data during transmission, a DMA "under-run" condition will occur, and the outgoing packet will be invalid and will require retransmission. If the LAN data rate exceeds the data rate at which the DMA can accept data during reception, a DMA "overrun" condition will occur, and the incoming packet will be improperly received and will require retransmission.

The combination of potentially low speed and universally variable latency severely restricts the speed of sustainable transfers that can be achieved when using motherboard DMA. On 80286- and 80386-based PCs, memory-to-memory data movement instructions executed by the processor can actually out-run DMA transfers. Consequently, on these machines, if significant buffering is needed in the adapter to assure smooth LAN data flow, it is preferable to use a packet buffer RAM, loaded and unloaded by software, as with a conventional LAN.

In addition to the concepts of LAN adapters and previous low cost arrangements for networking PCs, another background subject pertinent to the present invention is flow control. Flow control relates to the use of signals to indicate the ability to receive data during a transfer and to indicate the successful receipt of the data after a transfer.

Most direct, high-speed I/O interfaces to computers use parallel I/O interfaces, which allow a plurality of related data and control signals to be communicated in parallel and simultaneously. In such parallel I/O interfaces it is conventional to have a dedicated control signal to indicate when new data is available for transfer and a second dedicated control signal by which the receiving side of the I/O interface responds to indicate acceptance of the data transfer and readiness for the next data transfer. This set of dedicated signals produces a request/acknowledge sequence for each transfer, often called a "handshake". A handshake provides an inherent form of throughput control, in that each parallel set of data is transferred when the receiving unit is known to be able to receive that data. However, this is not generally referred to as flow control, which is a term usually reserved for describing the functionality of various types of serial interfaces.

Serial I/O interfaces, of which LANs can be regarded as one type thereof, transfer data sequentially, one bit at a time, thereby allowing transfers at longer distances and lower costs than multi-bit parallel interfaces. It is not possible to implement a conventional handshake at the basic transfer level in serial interfaces, since a handshake would require a signal path in addition to the serial signal path.

Flow control is not usually used to control data transfers on a LAN. Instead, LANs transfer blocks of data in packets. If flow control is applied at all on a conventional LAN, it occurs at the packet or higher level. On such LANs, acknowledgements are provided at the packet level, and retransmission of an entire packet is the only means of recovering from unsuccessfully delivered packets, including those whose unsuccessful delivery was due to a receiver that was not ready to accept one or more bytes of the packet, rather than a data error during the transfer.

Some LANs implement a primitive form of flow control in the form of a "Free Buffer Enquiry" or a "Request To Send" frame. These are short, special-purpose messages sent over the network to attempt to determine if the intended destination node is able to receive the pending data packet transmission. The response to these flow control frames are in the form of a short "Acknowledge", "Negative Acknowledge" or "Clear To Send" frame. It is important to note that all of these messages require the transmission of actual network frames, which require significant time to transmit and receive. A further drawback of the frame-based flow control, especially on LANs without dedicated packet buffers, is that a determination that the receiver is ready does not mean that the receiver will be able to accept the data at the rate it is going to subsequently be sent.

On low speed serial I/O ports for computer systems, flow control is frequently used to regulate the transfer of data on a byte-by-byte basis. The traditional form of this flow control is to use discrete signals, typically called Request-To-Send (RTS) and Clear-To-Send (CTS), in addition to the Transmit Data (TXD) and Receive Data (RXD) signals. The use of these signals actually makes the "serial" interface a 2-bit parallel interface, but this 2-bit parallel connection is still regarded as serial, probably because the added signal(s)

are used strictly for control functions, while the data transfer itself occurs serially, using a single conductor.

When using RTS/CTS flow control, a source asserts RTS, and waits until the corresponding assertion of CTS by the destination. Once the CTS is received, the source transmitter is activated. The major distinction between RTS/CTS flow control and parallel interface handshaking is that the assertion of CTS indicates readiness to receive, not the successful receipt of the data transferred. Thus the RTS/CTS signalling technique is limited to controlling flow, and has no acknowledgement function.

Because the electrical characteristics and cabling requirements of a TXD/RXD/RTS/CTS interface limit the distance over which the interface can be used on a cost effective basis, serial data communication links have adopted another type of flow control, called character-based flow control, for longer distance usage. Character-based flow control uses certain character codes transmitted to indicate that further communication should be stopped and restarted. Commonly used codes are XOFF (ctrl-S) to halt a transmission and XON (ctrl-Q) to restart a transmission. One drawback to character-based flow control is the fact that at least two of the possible data codes are reserved for control purposes, which requires that software ensure that these codes never appear in the data being sent. Another drawback to character-based flow control is that the transceiver circuitry or higher level software must be able to detect and respond to these codes within the time duration for the transmission of one character, thereby limiting transfer rates. Since XOFF and XON can be thought of as 1-byte frames which have been simplified because a serial, point-to-point link does not require address fields and command fields which are required with a LAN, character-based flow control can be thought of as a degenerate form of frame-based flow control.

It is against this background that the significant improvements and advancements of the present invention have evolved.

SUMMARY OF THE INVENTION

The present invention relates to a LAN for connecting PCs which offers moderate performance at relatively low cost for connecting a moderate number of network nodes. The present LAN achieves these desireable improvements by using a network controller means which is interactive with network driver software resident on the PC. A network adapter to which the PC is connected, uses the motherboard DMA of the PC for obtaining the data transfers between system memory of the PCs, rather than any local processing or on-board packet buffering. Actual data throughput between memory buffers at the transmitting and receiving nodes is enhanced or maximized for each transmission of bytes between nodes at the time of each transmission by using an adaptive throughput control technique. The adaptive throughput control controls the transmission of individual bytes of data over a communication link between nodes by providing a minimum time gap between sequential ones of the data bytes transferred. The duration of the inter-byte time gap is determined by the network controller means of the receiving node successfully receiving the transmission of the previously transmitted byte and becoming able to accept the next sequential data byte to be transferred.

The adaptive throughput control permits PCs with greatly different motherboard DMA speeds or varying latencies to communicate reliably without requiring a packet buffer on the network interface. The sustained data transfer rate is dynamically adjusted to avoid overrun and underrun conditions at both communicating nodes. The adaptive throughput control incorporates handshaking by incorporating in each data byte transferred a unique signal which is detected by the receiving network controller means and in response to which a response signal is sent by the receiving network controller means when it is ready to accept the next data byte. Due to this type of handshaking, the present LAN is able to operate at significantly higher serial data rates, for example 3.58 Mbps, without requiring the expense or complexity of packet buffer RAMs or large FIFOs and without the use of reserved codes. Adaptive throughput control allows operation at the highest, mutually achievable, data rate between the pair of PCs involved in the communication activity, with this rate being variable on a byte-by-byte basis as the other activity, such as the DMA latency, varies on the two communicating PCs.

Many other advantages and improvements are discussed in or are apparent from the following more complete description of the present invention, its scope as set forth in the appended claims, and from the accompanying drawings, which are briefly summarized below.

BRIEF DESCRIPTION OF THE DRAWINGS

FIG. 1 is an illustration of the LAN of the present invention, illustrating a star topology preferably employed to connect a plurality of nodes.

FIG. 2 is an illustration of a network communication link between two nodes or a node and a hub as shown in FIG. 1.

FIG. 3 is a block diagram of a network adapter shown in FIG. 1 and partially in FIG. 2.

FIG. 4 is a block diagram illustration of the data flow between a pair of nodes of the LAN shown in FIG. 1.

FIG. 5 is an illustration of an encapsulated byte which is communicated over the LAN shown in FIG. 1.

FIG. 6 is an illustration of a frame which is formed from a plurality of encapsulated bytes shown in FIG. 5.

FIG. 7 is an illustration of the steps in a sequence of communicating a message between a sending node and a receiving node on the LAN shown in FIG. 1.

FIG. 8 is an illustration of the signals communicated over the two signalling paths of a network communication link, which reveals the relative timing relationships of signals sent and the adaptive throughput control obtained by the source and destination nodes of the network communication link shown in FIG. 2.

FIG. 9 is a functional block diagram of the transmitter logic and receiver logic obtained from the network controller of the network adapter shown in FIG. 3.

FIG. 10 is a layout diagram of a control register of the network controller of the adapter shown in FIG. 3, used to receive software commands sent to the network controller.

DETAILED DESCRIPTION OF THE PREFERRED EMBODIMENT

The presently preferred embodiment of the LAN of the present invention provides a baseband, half-duplex, isochronous communication network, shown generally in FIG. 1. Each node 20 of the network includes an interface adapter 22 and a conventional PC 24. The portrayal of all network nodes 20 as having attached PCs 24 is typical of the intended primary use of the present invention, but is not intended to exclude other types of digital information processing devices which may be attached to the adapter 22 at the node 20. Each attached device includes a DMA capability compatible with the DMA capability of a conventional PC 24. In the preferred embodiment, each PC is an International Business Machines-compatible PC. In practicing the invention by using PCs other than IBM-compatible PCs, including those such as Apple, a form of programmed-I/O by the central processor achieves memory access.

The LAN communication medium is organized as a physical star and logical star or bus, as shown by communication links 26 connecting the nodes 20. In a star topology, the communication links 26 radiate from a common connection point or node referred to as a "hub". The nodes 20h serve as the hubs in the preferred embodiment, although the hub functionality may be achieved by devices which are not nodes and which do not incorporate an attached data processing device. The hub, whether a node or not, incorporates a switching function (either circuit switching or packet switching), so that the incoming message is only retransmitted on the link needed to route that message to, or along an inter-hub link between hubs 20h, toward its addressed destination. Only in the case of a broadcast message is an incoming message at a hub transmitted on more than one outbound link. In cases where the hub function is achieved at a node and the incoming message is addressed to the hub node itself, the incoming message is accepted at the hub and not retransmitted on any outgoing link. In the case of a logical bus, the plurality of nodes are connected to a common electrical interconnection. Transmission by any node is received, approximately simultaneously, by all other nodes connected on the bus. In this logical bus type of interconnection the circuit switching or packet switching functions of the hubs are not required, since the hubs, if any, serve merely as electrical repeaters. The present invention is as applicable to logical buses as to the logical star described below as the preferred embodiment.

The topology of the present LAN may involve a single hub with communication links radiating to the remote nodes, as shown by either the left or right half of FIG. 1, or the topology may utilize multiple hubs which are linked together by inter-hub communication links 26 and to which one or more remote nodes may also be connected as shown in FIG. 1. The remote nodes at the outer ends of each radiating link 26 each have a single-port network interface adapter 22 installed in the I/O slot of the PC 24 at that node. The PCs at each hub node 20h have multiport network interface adapters installed in their I/O slots. A multiport adapter 22 has the same functionality as a single port adapter, except that the multiport adapter can receive and transmit signals over any of its connected communication links 26, and thereby achieve the functionality of a hub.

The communications links 26 between two nodes 20' and 20" (or between a node and a non-node hub) are 4-wire cables, such as two twisted pairs of standard telephone cables 28 and 30, as shown in FIG. 2. The two twisted pairs 28 and 30 provide two fully symmetric, unidirectional, differential signal paths between the connected nodes 20' and 20". The two signal paths differ only in direction. During message communication these two signal paths are used simultaneously for transmitting and receiving data and adaptive throughput control information, as will be described below. Preferably the signalling between nodes occurs in compliance with the RS-422 standard. With appropriate, non-RS-422 transceivers, an equivalent, full duplex signal path can be achieved on a single pair of wires.

The signal path provided by the twisted pair 28 is driven unidirectionally at the node 20' by a differential line driver 32, and the signal path provided by the twisted pair 30 is driven unidirectionally at the node 20" by another differential line driver 34. The differential line drivers 32 and 34 are preferably each a 26LS31 line driver, which is a standard part made by Advanced Micro Devices, National Semiconductor, Texas Instruments, and others. Each line driver 32 or 34 takes a TTL-compatible logic signal at its input and generates a differential pair of signals which conform to Electronic Industries Association (EIA) standard RS-422 at its output.

The signals on the signal paths provided by the twisted pairs 28 and 30 are received by differential line receivers 36 and 38, respectively, on the other end of the twisted pairs. Preferably, the line receivers 36 and 38 are each a 26LS32 line receiver, which is a standard part made by Advanced Micro Devices, National Semiconductor, Texas Instruments, and others. Each line receiver 36 and 38 takes an RS-422 compatible differential signal at its input and generates a TTL-compatible logic signal at its output. To minimize signal reflections and ringing on the wire, each incoming signal is terminated using a resistor 40 connected across the input terminals of each line receiver. The resistance of the resistor 40 is about equal to the impedance of the twisted pair to which it is connected, typically about one hundred ohms on common telephone wire.

Connection of the communication links 26 to the adapters 22 is facilitated by using connectors 42 by which to connect the two twisted pairs to each adapter.

The basic components of a network adapter 22 are shown in block form in FIG. 3. The network adapter 22 interfaces with a bus 44 of the PC to obtain the data, address, I/O control, and clock signals, and to access one of the DMA channels provided by the PC motherboard. The bulk of the network control function is performed by a network controller 46, which is closely coupled to network driver software resident on the PC. In the preferred embodiment, the network driver software is NETBIOS-compatible and achieves the typical network protocol functionality in addition to the specific functionality of the present invention.

A bus buffer 47 allows buffering of data between the bus 44 and the controller 46. A decoder 48 performs I/O address space decoding. Control signals 49, for example DMA request and acknowledge signals and an interrupt signal by which to request activation of the network driver software, and the master clock signal 50 for the network controller are all received from or driven to the PC bus 44. A differential line driver, e.g. 32, and a differential line receiver, e.g. 38, are connected to a transmit data out terminal 51 and a receive data in terminal 52, respectively. The signals on the communication links 26 which have previously been described in conjunction with FIG. 2 are sent from the network controller 46 at the transmit data out terminal 51 and are received at the receive data in terminal 52. The network controller 46 may be implemented in an logic cell array (LCA) programmable gate array, or in a mask-programmed application specific integrated circuit. The bus buffer may be a 74LS245 octal buffer. The decoder 50 may be a PAL16L8 programmed as an address decoder.

The transfer of data between a pair of PCs 24' and 24" connected at two nodes 20' and 20" is illustrated in FIG. 4. Each PC includes a processor 53 and a system memory 54 connected to the system bus 44. In addition, the adapter 22 is also connected to the bus 44, as has been previously described. The illustration of FIG. 4 is typical of a remote node-to-hub node transfer or a hub node-to-remote node transfer. Each message or packet is transferred directly from a transmit buffer 56 in the system memory 54 of the sending PC 24' to a receive buffer 57 in the system memory 54 of the receiving PC 24". This is accomplished by DMA transfer from system memory on the sending PC 24' to its connected adapter 22, which sends the packet over the communication link 26 to the adapter 22 of the receiving PC 24". A DMA transfer from the adapter 22 of the receiving PC 24" places the data in system memory of the receiving PC. This data transfer path is depicted by the dashed line path 60. Note that no packet buffering for messages or frames between the system memories 54 of the sending and receiving PCs is required on the path 60.

Each byte from system memory is transferred between adapters 22 as an encapsulated byte 62 shown in FIG. 5. As used herein a "byte" may not necessarily be an 8-bit byte, although that is what is illustrated. As used herein, a "byte" is a basic transmission unit which is substantially shorter than a packet and which is appropriate for use by a network adapter. Each encapsulated byte 62 utilizes 10 or more bits, of which 8 bits form a conventional 8-bit byte 64. The bit on the left is transferred first, followed by the bits in the next sequential positions to the right, as shown in FIG. 5. Each encapsulated byte 62 begins with a start bit 66 which is always equal to 1. The eight data bits which form the conventional byte 64 follow next, with the low order bit sent first. The encapsulated byte 62 ends with at least one stop bit 68, which is always equal to 0. The number of zero value stop bits 68 may be extended as needed. The time duration of each bit, and the spacing of the start bit, eight data bits, and first stop bit remain fixed for each encapsulated byte 62 as determined by the master clock signal 50 (FIG. 3).

A number of encapsulated bytes 62 form a message in the form of a frame 70, which is shown in FIG. 6. The encapsulated byte 62 on the left is transferred first, followed by the encapsulated bytes in the next sequential positions to the right. Frames 70 are used for data packets, etc. Each frame 70 comprises three, multi-encapsulated byte fields: a header 72, containing address, routing, and control information; a data area 74, which holds the application data being transferred; and a check sequence 76, which holds error-detection or error-correction codes, typically cyclic redundancy check (CRC) or longitudinal redundancy check (LRC). The specifics of the bytes contained within the frames 70 is particular to the higher layer network protocol(s) in use over the network, and which are not part of the present invention.

The communication of each packet or message involves several steps which occur in the sequence shown in FIG. 7. In order to initiate the transmission of a message, the network driver software at the processor of the sending node sets up the DMA controller of its PC to perform a DMA transfer from system memory to the attached adapter. The network driver software then issues a command (80) to the adapter to enable the transmitter (82). The first action external of the sending node in a transmit sequence involves the sending adapter sending an Inquiry signal (84) to the adapter of the receiving node. The Inquiry signal informs the destination adapter of the pending transmission.

The Inquiry signal is detected (86) at the receiving node, which causes its adapter to issue an interrupt signal (88) to activate the network driver software of the destination PC. The interrupt signal causes the network driver software at the receiving node to set up the DMA controller on its PC to perform a DMA transfer from the adapter to the system memory. The network driver software then issues a command (90) to the receiving adapter to enable the receiver (92) to accept signals received from the sending node. The first action of a receive sequence external of the receiving node involves the receiving adapter sending a Response signal (94) to the adapter of the sending node. The Response signal informs the sending adapter of the readiness of the destination adapter to receive the message transfer.

Upon detection of the Response signal (96), the sending adapter commences (98) the data transfer as a result of the DMA controller performing DMA fetch cycles (100) and the sending adapter sending encapsulated bytes to the receiving adapter (103). The data transfer facilities of the receiving adapter receive these bytes (104) and perform DMA store cycles to place the received data into the system memory (106). The transfer rate for encapsulated bytes is regulated by both the rate these bytes can be obtained from memory (100) at the sending node, and the rate that these bytes can be stored into memory (106) on the receiving node. This latter rate is indicated by the receiving node sending a clear-to-send (CTS) signal (105) to the sending node, as described in greater detail below.

At the end of the data transmission (10B), a completion interrupt signal (110) is delivered by the adapter to the driver software of the sending PC. Similarly, at the end of the data reception (112), a completion interrupt signal (114) is delivered by the adapter to the driver software of the receiving PC. The interrupt conditions at both the sending and the receiving adapters generally result from a timeout of a timer at each node which defines a maximum permissible inter-byte interval. The advantage of using a timeout to detect an end of frame condition is that failures of either the sending node, the receiving node, or of the network communication link are detected by the same mechanism as the intended end of frame or message. These various network error situations can be distinguished from the successful delivery of a message by examining the residual DMA byte counts and/or the error detection facilities of the network controller. In most network protocols the length of the frame is encoded in the frame header (72, FIG. 6), allowing the DMA transfer count to be cross-checked with the actual frame length.

Each encapsulated byte which is transferred during the message communication sequence shown in FIG. 7 is subject to a handshake confirmation of successful receipt and of the readiness of the receiver to receive another encapsulated byte to obtain the adaptive throughput control technique of the present invention. The signalling which the network controllers at the sending and receiving nodes interpret to obtain the adaptive throughput control involves a clear-to-send (CTS) signal transmitted from the receiving node to the sending node. The CTS signal and the others which are used for the handshake as a part of the adaptive throughput control are illustrated in FIG. 8.

The relative timing of the communication of the Inquiry, Response, the data, and the (CTS) signals which occur on the two signal paths (28, 30, FIG. 2) which constitute the communication link (26, FIG. 2) between the sending and receiving nodes during the transfer of encapsulated byte is shown in FIG. 8. The network controller of the adapter at the sending node asserts a signal 122 at its transmit data out terminal 51 (FIG. 3). Since a transmission is just commencing, the signal 122 is interpreted by the receiving node as an Inquiry. The assertion of the Inquiry is detected at the receive data in terminal 52 (FIG. 3) of the network controller of the adapter of the receiving node. The network controller of the receiving adapter generates the interrupt 88 (FIG. 7) as a result of detecting the Inquiry. When the receiving node is prepared to accept the message transfer, the network controller of the receiving adapter asserts a signal 124 at its transmit data out terminal. Since the signal 124 occurs after the Inquiry, it constitutes a Response. The Response is received at the receive data in terminal 52 (FIG. 3) at the sending adapter network controller and is detected as a Response. The Response appears electrically identical to an Inquiry, but is distinguished from an Inquiry by the time of its occurrence and by the fact that it is received at the node which is asserting the Inquiry. A Response is detected only after the sending node has asserted an outgoing Inquiry (otherwise this same signal would be interpreted as an Inquiry coming into this node). Detection of the Response allows the sending node to initiate DMA fetch cycles (100, FIG. 7) and commence sending of the fetched data bytes to the receiving node.

Each byte transferred between the sending node and the receiving node is subject to a handshake used by the adaptive throughput control mechanism. The first encapsulated byte 120 is implicitly allowed to be transmitted based on the receipt of the Response 124 in response to the Inquiry. The detection of the Response at the sending node results in immediate negation of the Inquiry 122, which makes the transmit data out terminal of the sending network controller available for sending the first encapsulated byte 120 of the frame or message. When the first conventional byte of the outgoing message is available from the DMA controller, the start bit 66 of the first encapsulated byte 120 is transmitted, followed by the eight data bits which form the conventional byte and at least one stop bit, all of which are shown in greater detail in FIG. 5. The receiving node detects the start bit 66 of the received encapsulated byte, and then receives the data bits of the conventional byte. The detection of the start bit 66 of the byte 120 causes immediate negation of the Response 124, which leaves the transmit data out terminal of the network controller of the receiving node available for sending a first CTS signal 126 to the transmitting node.

When the receiving node has successfully received the data byte and provided it to the DMA controller for transfer to system memory, the CTS signal 126 is sent to the sending node. The time duration 127 between the receipt of the data bits of the encapsulated byte and the assertion of the CTS is arbitrary and dependent on the functionality of the PC and DMA controller at the receiving node. The duration 127 is subject only to an upper unit of a maximum time which constitutes an end-of-message timeout. The CTS is asserted at an appropriate point in time relative to the receipt of the encapsulated byte. This may occur at any time after this byte has been successfully received and is typically after the received data byte has been transmitted for delivery by the DMA controller to system memory. Thus the assertion of the CTS indicates successful delivery and availability to receive more bytes.

The sending node detects the assertion of the CTS signal 126. Detection of the CTS signal is unambiguous because Inquiries cannot occur during a data transfer, and CTS signals must occur during a data transfer. Detection of the CTS signal allows the sending adapter to send the next encapsulated byte 128. The start bit 66 of the next encapsulated byte 128, in turn, causes immediate negation of the CTS signal 126, preparing the receiving adapter to send the next CTS signal. This encapsulated byte-by-encapsulated byte handshaking provided by the start bit and the CTS signal proceeds in the same manner until all of the encapsulated bytes forming each message or frame have been sent. The Inquiry, Response, start bit and CTS signals are the assertion of an analog bit-like signal, and the detection of these signals is accomplished simply by edge or level detection.

The end of the message is detected by expiration of a time out period. This time out period is reset with each byte transferred, and will time out if no transfer occurs within a predetermined timeout period, which is about 13 microseconds in the preferred embodiment. Since this predetermined timeout period is considerably longer than the normal inter-encapsulated byte gap 132 when using adaptive throughput control, the timeout can be used to detect both the actual end of the message, as well as failures of the network communication link or the failure of the nodes at either end of the communication link. Means for ending the transfer in all of these cases is important, because with the adaptive throughput control in operation, occurrence of any of these failures will halt the transfer. In other words, a failure to achieve the handshake within the timeout period will halt the transmission. The timeout detection provides a single mechanism to cover all of these situations. The timeout period for not detecting a Response to an Inquiry is considerably longer than an end of message timeout, about eight milliseconds in the preferred embodiment.

A significant aspect of this throughput control is the generalized nature of the results. As long as an inter-byte time delay gap 132 does not exceed a predetermined timeout interval, any cause for delay in delivery of the next byte is handled by a uniform mechanism. These delays can be caused by DMA latency on the PCs at either end of the communication link, by memory access delays (e.g. wait states) during the DMA cycles on the PCs at either end of the communication link, by synchronization delays in the adapter logic, by cable delays, etc. To the adapter logic all of these time discrepancies appear like inter-byte gaps, and are subject to a uniform control mechanism.

The logic of the network controller in achieving the transmitting, receiving and adaptive throughput control functions is better understood with reference to the transmitter and receiver logic obtained from the operation of the controller 46 (FIG. 3), which is illustrated by the functional block diagrams of FIG. 9.

A transmitter logic control 134 controls the transmitter logic. The control 134 issues DMA request signals at 136 to the DMA controller of the PC. The DMA controller responds by delivering bytes from system memory during DMA fetch cycles on the data bus 44. The bytes from system memory are strobed into the transmit data register 138 where they are temporarily held. Upon receipt of a Response to the Inquiry or upon receipt of a CTS to each remaining byte of the message or packet, the contents of the transmit data register 138 are transferred to a transmit shift register 140. A start bit flip-flop 142 of the transmit shift 140 register is set (=1) whenever the transmit shift register is loaded to provide the first bit for the encapsulated data byte which is shifted out of the transmit shift register 140. Thereafter, in synchronism with the clock signal used for defining the network bit rate (which is derived from a clock signal of the PC in the preferred embodiment), the contents of the transmit shift register 140 including the start bit from the flip-flop 142 are shifted out, one bit per clock period, onto the transmit data out terminal 51. After completion of the DMA fetch cycle, the DMA controller supplies a DMA acknowledge signal 144 to the logic control 134, thereby signalling the logic control 134 that the transmit data register 138 has been filled and another DMA fetch cycle can be commenced at the appropriate time.

In some implementations, it may be possible to omit the transmit data register 138, and strobe the data byte fetched by the DMA controller from system memory directly into the transmit shift register 140, but this approach precludes issuing the next DMA fetch request 136 before the current byte has been fully shifted out of the transmitter shift register 140. By use of the transmit data register 138, the transmitter control logic circuit 134 obtains the ability to overlap DMA requests 136 for the next byte from system memory before the completion of sending the current byte. The next DMA fetch cycle can be completed to position the next data byte in the transmit data register 138, before the earliest time that the Response or CTS signal could be received from the other node to which the message communication is occurring. The capacity of the registers 138 and 140 is considerably smaller than the size of the packet buffers required in conventional LAN adapters, thereby saving significant cost.

Inquiries ar sent by setting a flip-flop 146 by a specific command (80, FIG. 7) generated by the network driver software for the purpose of setting the flip-flop 146. This specific command creates a signal 148 to the set input of flip-flop 146 by means of an OR gate 147 and its output signal 149. The output of the flip-flop 146 is supplied to an OR gate 150 prior to delivery of the data from the transmit shift register 140 at the transmit data out terminal 51. A Response to an Inquiry is detected at the receive data in terminal 52 by a detector 152. The detector 152 detects the active edge or level, depending on implementation of the signal, at receive data input terminal. This signal edge or level constitutes a Response during an Inquiry, a CTS during a data transmission, or a start bit during data reception. The detector 152 serves as a Inquiry detector when no transfer is in progress, a start bit detector for the receiver logic during message reception, a Response detector for the transmitter logic while an Inquiry is pending, and a CTS detector for the transmitter logic during a message transmission. Thus there is considerable conservation of functionality and a reduction in the amount of circuitry required to obtain this functionality, by causing the detector 152 to detect these three conditions depending on the status of the communication occurring at the time the signal is detected. These three conditions are indicated by the detector 152 supplying an output signal 153.

The output signal 153 of the detector 152 clears the flip-flop 146, which is only necessary during an Inquiry since the flip-flop 146 is already clear upon receipt of a CTS during each data transfer. With the flip-flop 146 clear, the path from the transmit shift register 140 to the transmit data out terminal 51 through the OR gate 150 passes the encapsulated bytes of data which form each packet or message. Similarly with respect to the function of the detector 152, the flip-flop 146 is a common means for generating an Inquiry, a Response and a CTS, which also obtains conservation of the amount of logic required to obtain this multifaceted functionality.

In coordinating all data movement, the transmit logic control 134 issues DMA requests 136 when the transmit data register 138 is empty and controls the assembly of the outgoing encapsulated bytes subject to data byte availability in the transmit data register 138 as signaled by DMA acknowledge signal 144 and the CTS received from the detector 152.

The basic data flow obtained by the receiver logic starts with an incoming signal at the receive data in terminal 52. The incoming signal is supplied to the detector 152 and a receive shift register 154. When no transfer is in progress, detection of an assertion at the receive data in terminal is interpreted as an Inquiry, generating an interrupt signal 88 which informs the network driver software to set up for reception of an incoming message. The interrupt signal 88 is supplied to the bus 44 as is generally illustrated by the bracketed designation. After such setup is complete, the network driver software issues a command (90, FIG. 7) supplied at 148 to the OR gate 147. The output signal 149 sets the flip-flop 146, and the signal from the set flip-flop is supplied to the OR gate 150. The signal from the OR gate 150 is supplied to the transmit data out terminal 51 and that signal constitutes the Response.

Once the Response has been sent, a receive logic control 158 is prepared for reception of data. Upon the reception of the first encapsulated byte of the message or packet, the receive logic control 158 interprets the first bit from the detector 152 as a start bit. Detection of the start bit results in a signal 159 applied to the OR gate 147 to clear the flip-flop 146. The immediate negation of the CTS at the transmit data output 51 results, so that a reassertion of the CTS after completely receiving the encapsulated byte can immediately trigger the transmission of the next encapsulated byte of the message.

The data bits of the received encapsulated byte which follow the start bit are shifted into the receive shift register 154 in synchronism with the transmitted clock rate synchronized by the arrival of the start bit. Upon receipt of the last bit of data of the encapsulated byte, the contents of the receive shift register 154 are transferred to a receive data register 160. A DMA request signal 162 to initiate a DMA store cycle is issued by the receive logic control 158 to the DMA controller of the PC. The DMA controller transfers the contents of the receive data register 160 into system memory, via the data bus 44.

In some implementations the receive data register 160 may be omitted, with the DMA store cycle obtaining data directly from the receive shift register 154. This is functionally equivalent to that depicted in FIG. 9, except that the logic associated with the receive data register 160 is not needed and the delay from completion of byte reception to issuance of CTS is longer because time to accommodate the DMA latency and the DMA cycle time are required before the CTS can be asserted. In either case, once the receive shift register 154 is emptied due to transfer to the receive data register 160 or by DMA to memory, as indicated by DMA acknowledgement 164, the receive logic control 158 can set the flip-flop 146 and thereby assert the CTS onto the transmit data out terminal 51. This setting is accomplished through OR gate 147, then to the set input of flip-flop 146, since the software command input 148 to the OR gate 147 is inactive during data transfers. Note that the start bit of the next received encapsulated byte will reset the flip-flop 146 as described above to allow the next CTS signal to be asserted after successful receipt of the present encapsulated byte. In some embodiments it may be possible for the CTS to be asserted slightly before the network controller is actually ready to receive the next encapsulated byte, based on anticipation of the time duration the network controller at the sending node will require to initiate the transmission of the next encapsulated byte.

FIG. 10 depicts the layout of the control register for the network controller of the preferred embodiment. The contents of this register, loaded over the system bus 44, provide control information to both the transmit logic control 134 and the receiver logic control 158, shown in FIG. 9. Bits 1-0 select one of the four available ports on the hub adapters 20h (FIG. 1). Only setting 00, to select the first port, is meaningful on the single port remote adapters 20. On the logical star network only one port of a hub is active at any instant, so this single, 2-bit field is sufficient for the selection. Bit 2 is presently not used. The information in bits 7-3 is applied to the operation of the port specified by bits 1-0.

Bits 5-3 control the transmitter and receiver operation. Bit 5 is the enable bit, and must be equal to 1 for any settings of bits 4 or 3 to have effect on data transfers. (Settings of bits 4 and 3 while bit 5 is equal to 0 may be useful for hardware testing but not for LAN operation.) Bit 4 is the direction bit, and is equal to 0 to transmit and is equal to 1 to receive. Bit 3 is the Inquiry/Response bit, and is set equal to 1 to cause an Inquiry (if bit 4 is equal to 0 for transmit) or a Response (if bit 4 is equal to 1 for receive). The internal flip-flop (146, FIG. 9) set by bit 3 being equal to 1 is cleared by the network controller upon receipt of the Response to an Inquiry or a start bit to a Response as well as by a timeout. The meaningful combinations of bits 5-3 include: 000—no activity; 101—transmit with Inquiry; and 111—receive with Response.

Bits 7-6 control the timeout duration. The timing begins when these bits are loaded, is reset by each DMA cycle, and times out after either 13 microseconds or 8 milliseconds. These bits are set to 00 when no timing is required, 01 for a short timeout (used mainly to test the timer), 10 for a long timeout (used mainly for interval timing between transfers), or 11 for a long timeout until DMA begins (to wait for a Response) and a short timeout thereafter (to detect end-of-message). When the timeout expires the transceiver is disabled and an interrupt is generated.

It is possible, although remote, that the nodes at both ends of the communication link will attempt to initiate a transfer simultaneously. In this case both nodes set up their transmitters and assert an inquiry before becoming aware of the others' activity. If this occurs, the inquiry from one will look like a response to the other; however, no data transfer can complete because neither node is set up to receive so no CTS signals are generated. This will result in a timeout without successful message reception at either end. This condition is dealt with by network driver software by having such non-deliveries retried at random time intervals to minimize the probability of multiple such conflicts. An alternative technique, possible but not used in the preferred embodiment, is to use token passing, which eliminates the potential for this problem to occur because only one token exists on the network and only the node in possession of the token is allowed to transmit.

The preferred embodiment uses DMA transfers, as described above. This is appropriate for all IBM PCs and compatible computers, as well as most other small and medium scale computer systems. However, there are some types of machines, most notably the Macintosh made by Apple Computer, which does not have any DMA capabilities. These machines perform all data transfers under direct control of the central processor, using low level software sequences generally referred to as programmed-I/O.

The adaptive throughput control mechanism of the present invention is equally applicable to machines using programmed-I/O as well as those using DMA. Consequently, the term "DMA" as used in the appended claims is intended to encompass the DMA capability of IBM and IBM-compatible PCs as well as those computers using programmed-I/O. The operation using programmed-I/O is highly similar to that described above, except instead of loading the transmit data register and unloading the receive data register by DMA transfers, the network driver software accomplishes this task with programmed-I/O transfers for each byte. The transfer readiness is indicated to this software by "transmitter data register empty" and "receiver data register full" status bits in a software-accessible status register rather than by DMA request signals.

The benefit of adaptive throughput control for machines using programmed-I/O instead of DMA is the same as with the (DMA-based) PCs: higher serial data rates and higher typical throughput are possible without expensive hardware. Rather than limiting the data rate to a level which is known to be supportable with worst case software latency (for example the 230.4 Kbps), the serial data rate can be much higher while the adaptive throughput control regulates the byte-by-byte transfers as dictated by the current transfer latency of each communicating processor.

Presently preferred embodiments of the present invention and many of its improvements have been described with a degree of particularity. It should be understood that this description has been made by way of preferred example, and that the invention is defined by the scope of the following claims.

The invention claimed is:

1. A LAN comprising at least two nodes connected together by a serial, full-duplex communication link, each node including a PC and a network adapter connected to the PC and to the communication link, the PC including a system memory and DMA means by which to transfer data bytes to and from the system memory, each adapter having network controller means by which to control the transmission and reception of signals over the communication link and by which to access operation of the DMA means, said network controller means further operatively:

controls the transmission of individual bytes of a message communicated over the communication link by providing a minimum time gap between sequential ones of the bytes transferred, the duration of the time gap being determined by the network controller means of a receiving node successfully receiving the transmission of the previously transmitted byte and becoming able to accept the next sequential byte to be transmitted.

2. A LAN as defined in claim 1 wherein:
the network controller means of the receiving node becomes able to accept the next sequential byte upon the DMA means transferring the received byte to system memory.

3. A LAN as defined in claim 1 wherein:
the minimum time gap is only of such minimum longevity to assure that the network controller means of the receiving node has accessed the DMA means to transfer the received byte to the system memory prior to receipt of the next sequential byte.

4. A LAN as defined in claim 1 wherein:
the network controller means of the receiving node transmits a CTS signal over the communication link to the network controller means of the sending node to indicate the availability of the receiving network controller to accept the next sequential byte; and
the network controller means of sending node transmits the next sequential byte after receipt of the CTS signal.

5. A LAN as defined in claim 4 wherein:
the network controller means of sending node transmits the next sequential byte upon receipt of the CTS signal.

6. A LAN as defined in claim 5 wherein:
the network controller means of sending node transmits the next sequential byte approximately immediately upon receipt of the CTS signal.

7. A LAN as defined in claim 5 wherein:
each byte transmitted by the network controller means of the sending node incorporates a predetermined unique signal with each byte transmitted;
the network controller means of the receiving node detects the unique signal in the received byte and negates the CTS signal in response to the detection of the unique signal; and
the network controller means of the receiving node becomes capable of asserting another CTS signal after its previously asserted CTS signal has been negated.

8. A LAN as defined in claim 7 wherein:
the network controller means of the receiving node asserts the CTS signal upon the DMA means assuming the control for transferring the data of the successfully received byte to system memory.

9. A LAN as defined in claim 7 wherein:
the network controller means of the receiving node asserts the CTS signal upon the DMA means transferring the data of the received byte to system memory.

10. A LAN as defined in claim 4 wherein:
the network controller means of the sending node further measures the time period between sequential bytes received and detects an error condition by the elapse of a time period greater than a predetermined maximum time period allowed between received bytes.

11. A LAN as defined in claim 4 wherein:
the network controller means of the sending node further measures the time period between sequential CTS signals received and detects an error condition by the elapse of a time period greater than a predetermined maximum time period allowed between received CTS signals.

12. A LAN as defined in claim 1 wherein:
the network controller means of the sending node sends an Inquiry signal to the network controller means of the receiving node to determine the availability of the network controller means of the receiving node to accept the message, the message comprising a plurality of bytes;
the network controller means of the receiving node sends a Response signal to the network controller means of the sending node in response to the Inquiry signal if the network controller means of the receiving node is available to accept the message; and
the network controller means of the sending node sends the first byte of the message after detection of the Response signal.

13. A LAN as defined in claim 12 wherein:
the network controller means of the receiving node transmits a CTS signal over the communication link to the network controller means of the sending node to indicate the availability of the receiving network controller to accept the next sequential byte of the message after successful receipt of the previous byte; and
the network controller means of sending node transmits the next sequential byte of the message after receipt of the CTS signal.

14. A LAN as defined in claim 13 wherein:
the network controller means of sending node transmits the next sequential byte approximately immediately upon receipt of the CTS signal.

15. A LAN as defined in claim 13 wherein:
each byte transmitted by the network controller means of the sending node incorporates a predetermined unique signal with each byte transmitted;
the network controller means of the receiving node detects the unique signal in the received byte and negates the CTS signal in response to the detection of the unique signal; and
the network controller means of the receiving node becomes capable of asserting another CTS signal after its previously asserted CTS signal has been negated.

16. A LAN as defined in claim 15 wherein:
the network controller means incorporate common means for generating the Inquiry, the Response and the CTS signals.

17. A LAN as defined in claim 15 wherein:
the network controller means incorporate common means for detecting the Inquiry, the Response and the CTS signals.

18. A LAN as defined in claim 15 wherein:
the network controller means of the sending node further measures the time period between sequential bytes received and detects an error condition by the elapse of a time period greater than a predetermined maximum time period allowed between received bytes.

19. A LAN as defined in claim 18 wherein:
the message transferred is a frame which has a field which contains check information by which to check whether the received bytes constitute the entire message; and the network controller means of the receiving node further uses the check information to determine if the received bytes constitute the successful receipt of the entire message after detection of the error condition.

20. A LAN as defined in claim 19 wherein:

the network controller means of the receiving node determines that the error condition represents a failure to receive the entire message if the received bytes do not constitute the entire message.

21. A LAN as defined in claim 15 wherein:

the network controller means of the sending node further measures the time period between sequential CTS signals received and detects an error condition by the elapse of a time period greater than a predetermined maximum time period allowed between received CTS signals.

22. A LAN as defined in claim 21 wherein:

the network controller means of the sending node determines that an error condition occurred if a CTS signal is not received in response to the transmission of a byte.

23. A LAN as defined in claim 15 wherein:

the communication link transfers signals serially between the sending and receiving nodes, each signal comprises at least one bit, and the rate at which bits are transmitted by the network controller means of the sending node is fixed by the PC at the sending node.

24. A LAN as defined in claim 15 wherein:

the communication link provides a pair of signal paths between the sending and the receiving nodes; and one of the signal paths is exclusively used for transmitting signals from a first one of the nodes to the other second node, and the other signal path is exclusively used for transmitting signals from the second node to the first node.

25. A LAN as defined in claim 24 wherein:

each signal path comprises a twisted pair of telephone wire-like conductors.

26. A LAN as defined in claim 15 wherein:

the network controller means of the receiving node transmits the Response and the CTS signals at a different time than the bytes are transmitted by the network controller means of the sending node.

27. A LAN as defined in claim 13 wherein:

the network controller means comprises register means of a size sufficient to hold at least one received byte but insufficient to hold the entire message.

28. A LAN as defined in claim 12 wherein:

the Inquiry signal and the Response signal constitute one of either an edge or a level of an analog signal.

* * * * *